United States Patent [19]
Lawandy

[11] Patent Number: 5,604,635
[45] Date of Patent: Feb. 18, 1997

[54] MICROLENSES AND OTHER OPTICAL ELEMENTS FABRICATED BY LASER HEATING OF SEMICONDUCTOR DOPED AND OTHER ABSORBING GLASSES

[75] Inventor: Nabil M. Lawandy, Providence, R.I.

[73] Assignee: Brown University Research Foundation, Providence, R.I.

[21] Appl. No.: 400,835

[22] Filed: Mar. 8, 1995

[51] Int. Cl.⁶ ............ G02B 27/10; G02B 3/00; G01J 1/20
[52] U.S. Cl. ............ 359/620; 359/722; 250/201.9
[58] Field of Search .................. 359/620, 722; 250/201.9; 252/501.1; 501/900

[56] References Cited

U.S. PATENT DOCUMENTS

| | | | |
|---|---|---|---|
| 3,586,816 | 6/1971 | Hagen | 219/121 |
| 3,689,264 | 9/1972 | Chandross et al. | 96/35.1 |
| 3,948,660 | 4/1976 | Deml et al. | 96/38.3 |
| 4,439,245 | 3/1984 | Wu | 148/1.5 |
| 4,478,768 | 10/1984 | Takeoka et al. | 264/1.4 |
| 4,729,641 | 3/1988 | Matsuoka | 359/43 |
| 4,734,729 | 3/1988 | Hertzel et al. | 354/304 |
| 4,775,967 | 10/1988 | Shimada | 369/44.39 |
| 4,842,782 | 6/1989 | Portney et al. | 264/1.4 |
| 4,899,048 | 2/1990 | Shelander | 250/231 SE |
| 5,053,171 | 10/1991 | Portney et al. | 264/1.4 |
| 5,148,322 | 9/1992 | Aoyama et al. | 359/708 |
| 5,208,698 | 5/1993 | Muller | 359/299 |
| 5,260,826 | 11/1993 | Wu | 359/368 |
| 5,294,518 | 3/1994 | Brady et al. | 430/290 |
| 5,491,762 | 2/1996 | Deacon | 385/16 |
| 5,500,869 | 3/1996 | Yoshida et al. | 372/50 |

FOREIGN PATENT DOCUMENTS

| | | | |
|---|---|---|---|
| 1252306A1 | 8/1986 | U.S.S.R. | 65/102 |
| 2233334 | 9/1991 | United Kingdom. | |

OTHER PUBLICATIONS

W. R. Cox et al., "Microjet Fabrication of Micro–Optical Components", Leos '94 Conference Proceedings, vol. 1, 1994, pp. 52–53.

Z. L. Liau et al., "Mass–Transport Efficient Microlenses In GaAs And GaP For Integration With High Power Diode Lasers", Leos '94 Conference Proceedings, vol. 1, 1994, pp. 67–68.

B. F. Aull et al., "Application Of Smart–Pixel and Microlens Arrays To Early Vision", Leos '94 Conference Proceedings, vol. 1, 1994, pp. 149–150.

"Binary Optics", W. Veldkamp and Thomas J. McHugh, Scientific American, May 1992, pp. 92–97.

S. S. Lee et al., "An 8x1 Micromachined Micro–Fresnel Lens Array For Free–Space Optical Interconnect", Leos '94 Conference Proceedings, vol. 1, 1994, pp. 242–243.

"The topography of laser–irrudiated germanium", D. C. Emmony et al., Journal of Physics D; Applied Physics, vol. 8, 1975, pp. 1472–1480.

*Primary Examiner*—Georgia Y. Epps
*Assistant Examiner*—Ricky Mack
*Attorney, Agent, or Firm*—Perman & Green

[57] ABSTRACT

Disclosed is a method of preparing refractive microlenses in a single step, utilizing laser-induced surface structure formation in semiconductor doped glasses (SDGs). The SDG materials, in conjunction with above-bandgap wavelength laser sources, are used to fabricate lenses that operate with light of below-bandgap wavelengths. In accordance with the teaching of this invention lenses on an approximately 5–500 μm diameter scale are fabricated individually or in arrays by laser irradiation of absorbing glasses. The microlenses have controllable characteristics and can be fabricated to have focal lengths as short as tens of microns. The lenses are generally parabolic or spherical in shape and are highly reproducible.

19 Claims, 7 Drawing Sheets

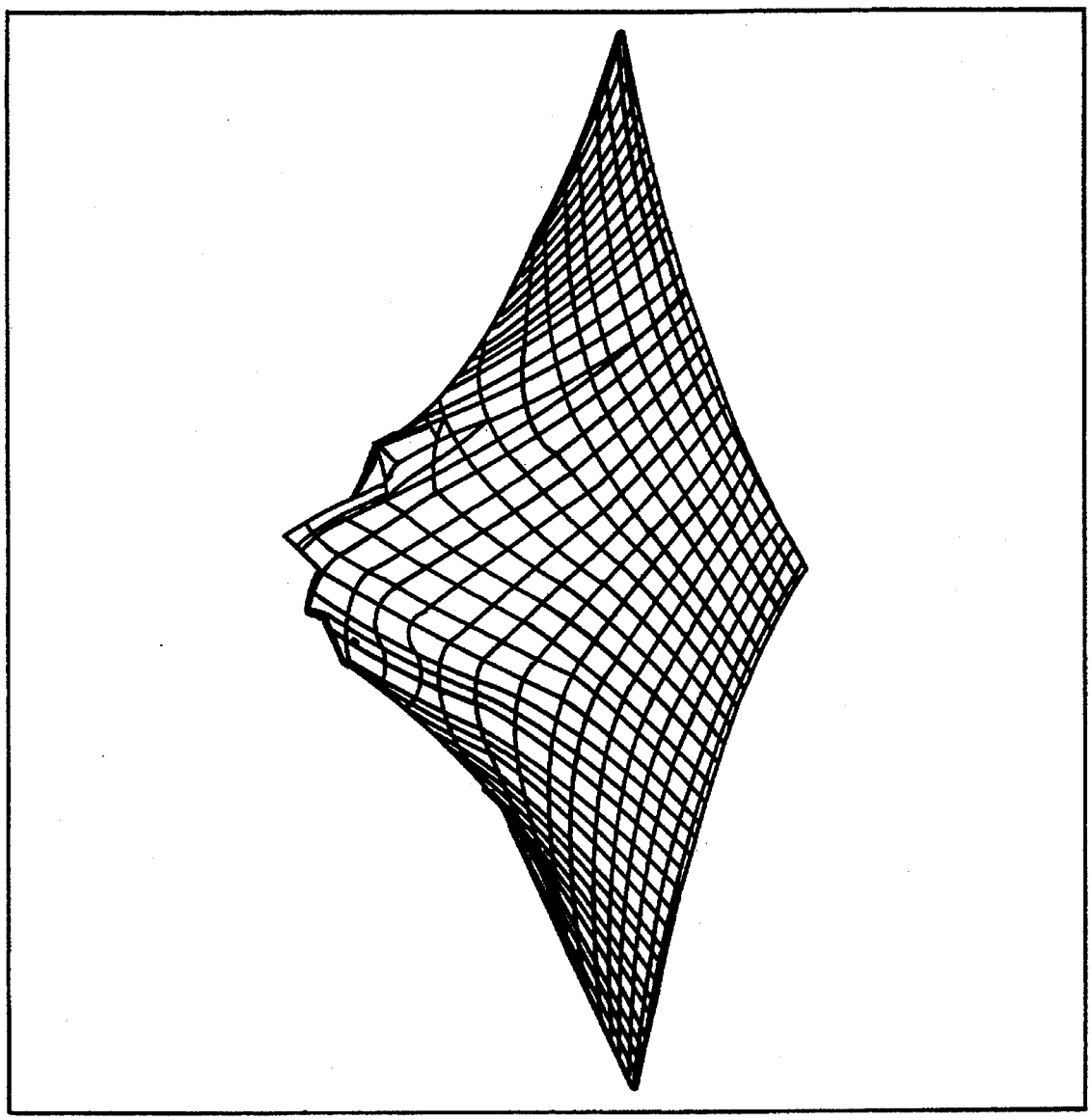
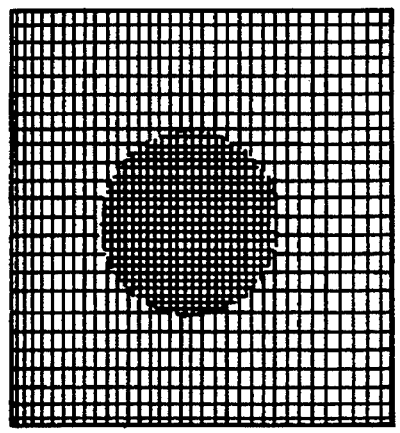
FIG. 7A
FIG. 7B

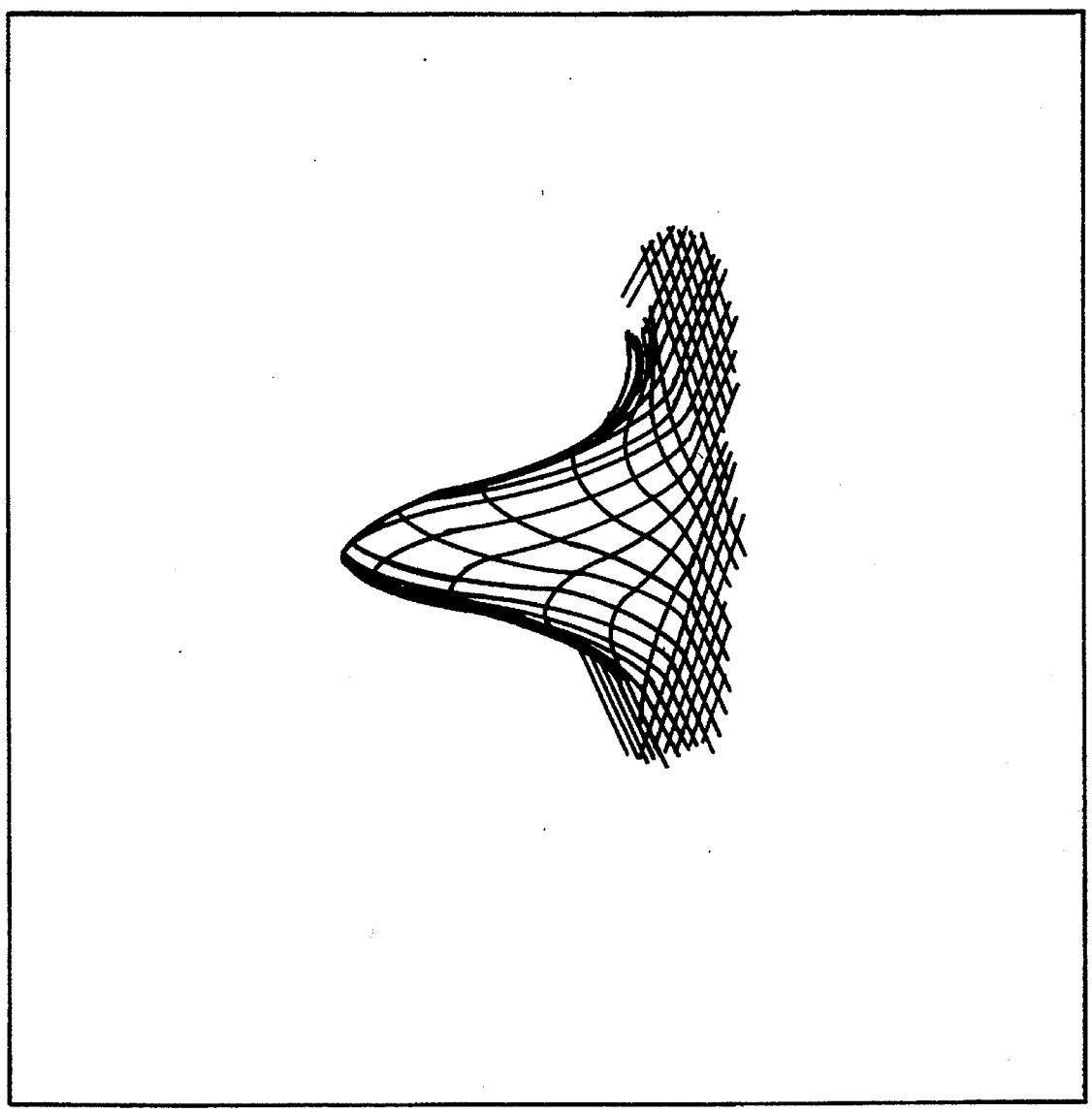
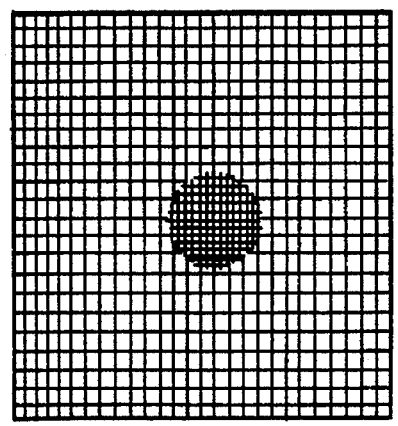
FIG. 8A
FIG. 8B

MICROLENSES AND OTHER OPTICAL ELEMENTS FABRICATED BY LASER HEATING OF SEMICONDUCTOR DOPED AND OTHER ABSORBING GLASSES

STATEMENT OF GOVERNMENT RIGHTS

This invention was made with government support under grant number F49620-94-1-0013 awarded by AFOSR and grant number F49620-92-0312 awarded by AASERT. The government has certain rights in the invention.

FIELD OF THE INVENTION

This invention relates generally to optical elements and to methods for fabricating same and, in particular, relates to microlenses and to arrays of microlenses.

BACKGROUND OF THE INVENTION

Due to the increasing use of small-scale optical devices such as diode lasers, optical fibers and CCD pixel elements, optics on a micron scale has become increasingly more important in science and industry. Numerous techniques have been employed to fabricate small-scale optical elements, almost all of which involve complex patterning steps followed by etching or ablation.

So called microlenses, just as their larger counterparts, can be classified as being refractive or diffractive. Examples of the latter include Fresnel zone plates which are comprised of a series of concentric light-blocking rings separated by slits. Binary optics is one technology that is suitable for fabricating Fresnel zone plate analogs and other diffractive optical elements using techniques that were originally developed for fabricating integrated circuits (i.e., photolithographic techniques). Reference in this regard can be made to the article "Binary Optics" by W. B. Veldkamp et al., Scientific American, May 1992, pps. 92–97.

In the LEOS '94 Conference Proceedings, Vol. 1, 1994, there are described several approaches to the fabrication of micro-optical components, in particular microlenses and arrays of same. In particular, reference can be had to the following four articles: W. R. Cox et al., "Microjet Fabrication of Micro-optical Components", pp. 52–53; Z. L. Liau et al., "Mass-Transport Efficient Microlenses in GaAs and GAP for Integration with High Power Diode Lasers", pp. 67–68; B. F. Aull et al., "Application of Smart-Pixel and Microlens Arrays to Early Vision", pp.149–150; and S. S. Lee et al., "An 8×1 Micromachined Micro-Fresnel Lens Array for Free-Space Optical Interconnect", pp.242–243.

In general, these and other known types of approaches rely on complicated multi-step processes such as surface micromachining or photolithography and etching to fabricate microlenses and microlens arrays. However, the fabrication of refractive-type microlenses is not readily accomplished by photolithographic techniques.

In U.S. Pat. Nos. 5,053,171 and 4,842,782 Portney et al. disclose the fabrication of an ophthalmic lens with an excimer laser. In this approach the laser is used ablate a surface of a plastic or glass blank.

OBJECTS OF THIS INVENTION

It is an object of this invention to provide a simplified method for fabricating refractive microlenses and microlens arrays.

It is another object of this invention to provide a method for fabricating microlenses and microlens arrays through the use of laser-induced surface structure formation in a material that selectively absorbs an appreciable fraction of the laser energy.

It is a further object of this invention to provide a method for fabricating microlenses and microlens arrays through the use of laser-induced surface structure formation in a semiconductor doped glass (SDG) material.

It is one further object of this invention to provide a method of fabricating microlenses and microlens arrays through the use of above-bandgap wavelength laser-induced surface structure formation in a SDG material, the resulting microlenses being subsequently useable at below-bandgap wavelengths.

It is still one further object of this invention to provide a microlens and array of microlenses that are fabricated in accordance with the method of this invention.

SUMMARY OF THE INVENTION

The foregoing and other problems are overcome and the objects of the invention are realized by a method of preparing refractive microlenses in a single step, utilizing laser-induced surface structure formation in semiconductor doped glasses (SDGs). The SDG materials, in conjunction with above-bandgap wavelength laser sources, are used to fabricate lenses that operate with light of below-bandgap wavelengths.

In accordance with the teaching of this invention lenses on an approximately 5–500 μm diameter scale are fabricated individually or in arrays by laser irradiation of absorbing glasses. Semiconductor nanocrystallite or microcrystallite doped glasses, such as those that are commercially available, are particularly attractive since they are transparent at wavelengths longer than the bandgap of the semiconductors (e.g., $CdSe_xS_{1-x}$). By example, focused cw laser light at 5145 Angstroms can be used with a predetermined type of commercially available SDG to produce lenses which can be used at all wavelengths longer than 5500 Angstroms, i.e., the bandgap of the constituent semiconductor material. The lenses have controllable characteristics and can be fabricated to have focal lengths as short as tens of microns. The lenses are generally parabolic or spherical in shape and are highly reproducible. The lenses fabricated in accordance with this invention also do not require that the substrate be disposed with any specific orientation to the gravitational force during lens formation.

Microlenses and arrays of microlenses that are fabricated in accordance with the teaching of this invention can be employed, by example, to collimate the output of diode lasers and optical fibers. Other uses include, but are not limited to, free space interconnects between optical computer backplanes.

BRIEF DESCRIPTION OF THE DRAWINGS

The above set forth and other features of the invention are made more apparent in the ensuing Detailed Description of the Invention when read in conjunction with the attached Drawings, wherein:

FIGS. 7A and 7B illustrate a far field pattern of a single-mode fiber output taken through the SDG substrate before the fabrication of a microlens shown in FIG. 3;

FIGS. 8A and 8B illustrate a far field pattern of the single-mode fiber output taken through the SDG substrate after propagation through the microlens shown in FIG. 3.

DETAILED DESCRIPTION OF THE INVENTION

As employed herein a microlens is intended to encompass an optical structure that is suitable for redirecting (e.g., focussing, concentrating, diverging, or collimating) electromagnetic radiation, that is formed upon a surface of a substrate, that is integral with and comprised of a material that is substantially the same as a material of the substrate (except as is detailed below), and that has a diameter that is equal to or less than approximately one millimeter (i.e., less than approximately $10^3$ micrometers).

Figure 1:
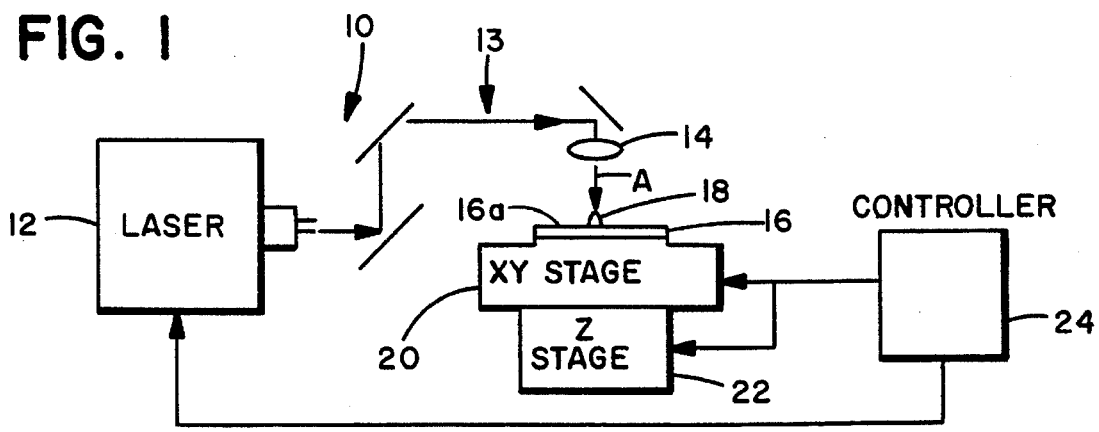
FIG. 1 is simplified block diagram of a system suitable for practicing this invention.

FIG. 1 illustrates a system 10 suitable for practicing a microlens fabrication method of this invention. A laser 12 has an output coupled to a suitable beam delivery system 13, such as an articulated arm, mirrors and the like, which is positioned for directing the laser energy (indicated as a focussed beam A) to a surface 16a of a substrate 16. The laser light is preferably focussed by one or more optical elements 14. The surface 16a is the surface upon which at least one refractive microlens 18 is to be formed, and the substrate 16 is comprised of a wavelength-selective optical absorber.

In a presently preferred embodiment of this invention the wavelength-selective optical absorber is comprised of semiconductor particles (referred to herein interchangeably as semiconductor nanocrystallites and semiconductor microcrystallites) that are embedded within a transparent (at wavelengths of interest) glass matrix.

The focussed laser light, when generated with a wavelength that is equal to or greater than the bandgap wavelength of the semiconductor microcrystallites within the substrate 16, is absorbed and causes a localized heating and melting of the glass matrix adjacent to the surface 16a. As employed herein the bandgap wavelength of a semiconductor material is intended to mean a wavelength that corresponds to a photon having an energy sufficient to generate electron-hole pairs in the semiconductor material (i.e., an energy sufficient to raise an electron from the valence band to the conduction band).

The localized melting of the glass matrix, in turn, results in the formation of a raised 'bump' of SDG material on the surface 16a. More particularly, the molten material of the substrate 16 exhibits a relatively large density change (e.g., 10–20%), which then wells up above the surface 16a before solidifying into a generally parabolic lens-like shape that forms, when re-solidified, the microlens 18. In accordance with this invention the raised 'bump' has been found to function as a refractive lens for light. The bump or lens is typically absorbing for light whose energy is above the bandgap of the semiconductor material. For some applications this absorption may be desirable (e.g., a filtering lens).

The substrate 16 is preferably mounted to a multi-degree of freedom positioning mechanism, such as an X-Y stage 20, so that the surface 16a of the substrate 16 can be located at a desired position relative to the focussed beam A. The use of the X-Y stage 20 is particularly advantageous when a plurality of microlenses 18 are to be fabricated as a one-dimensional or a two-dimensional array. If desired, a Z-axis stage 22 can also be employed for controlling the size of the focussed spot of laser light on the surface 16 and, hence, the diameter and profile of the microlens 18. A suitable controller 24 is provided for operating the positioning mechanisms 20 and 22 and, optionally, also the laser 12.

The substrate 16 is preferably comprised of a volume of silica-based glass host material having a plurality of semiconductor nanocrystallites embedded therein. By example, the substrate 16 is comprised of a borosilicate glass host material containing $CdS_{(1-x)}Se_x$ nanocrystallites. The nanocrystallites are typically uniformly distributed throughout the glass host material and have a nominal spacing between them that is a function of the concentration (typically in a range of approximately 0.3 mole percent to approximately 50 mole percent or greater) of the nanocrystallites. The concentration of the microcrystallites should be adequate to cause enough of a localized heating effect, at a selected laser intensity, to induce the localized melting of the glass host.

In other embodiments of this invention the glass host may include, by example, PbS, CuCl, GaAs, InP, ZnSe, or ZnSeS semiconductor nanocrystallites.

As employed herein, a semiconductor nanocrystallite or microcrystallite is considered to be a single crystal or a polycrystalline aggregate of a semiconductor material having an energy band structure and an associated bandgap energy. The nanocrystallites are randomly oriented and have typical dimensions on the order of approximately 100 Angstroms to approximately 200 Angstroms. Commercially available glasses containing such semiconductor nanocrystallites are used as optical filters. By example, a series of such filters is available from Schott Glass, the filters being identified with a nomenclature that includes a number, such as 495, which gives the approximate semiconductor bandgap in nanometers. The teaching of this invention is, of course, not limited to use with only commercially available SDG substrate materials.

When exposed to light having wavelengths equal to or shorter than a wavelength associated with the bandgap energy, the light is absorbed by the semiconductor nanocrystallites, thereby creating the localized heating of the surrounding glass host or matrix. Light having wavelengths longer than the wavelength associated with the bandgap energy is not appreciably absorbed, and is transmitted through the glass host.

Figure 2:
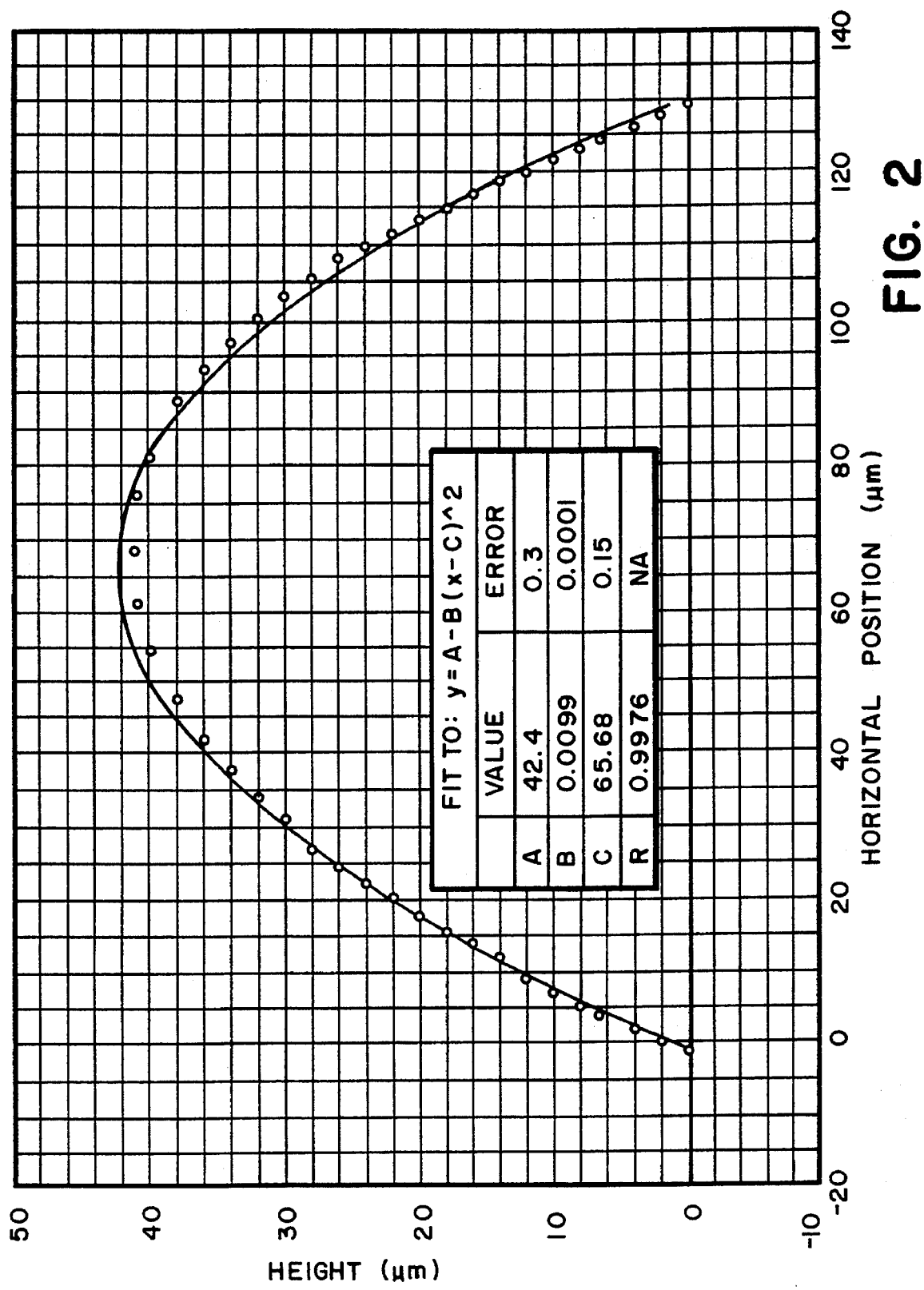
FIG. 2 is a graph, generated from data obtained with a surface profilometer, that illustrates a lens profile with a 130 μm focal length.
Figure 9:
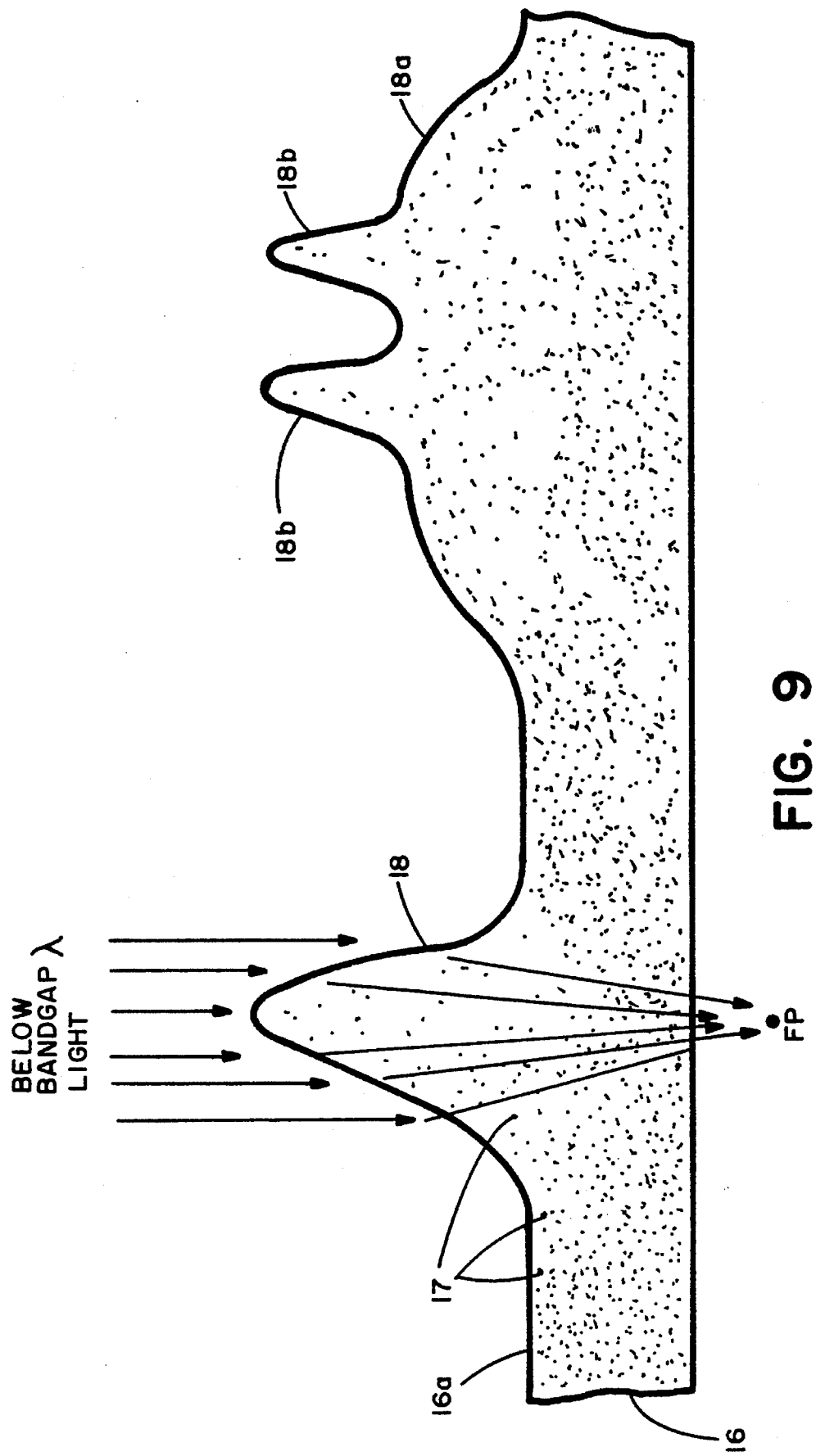
FIG. 9 is an enlarged cross-sectional view, not scale, of a plurality of microlenses fabricated in accordance with this invention.

FIG. 2 illustrates a surface profilometer scan of the surface 16a of the SDG substrate 16 after exposure to the focused beam A of laser light. The data shows that the laser 12 has produced a small bump on the surface 16a. This bump forms the refractive microlens 18 which transmits light having wavelengths longer than the bandgap wavelength. In addition, there is evidence for an index of refraction change in the affected SDG material of the microlens 18, as well as for a migration of the semiconductor nanocrystallites away from molten glass that forms the microlens 18 (as is illustrated in FIG. 9). Both of these effects are believed to contribute to the phase shift of light passing through the microlens 18.

In general, the reduction in the index of refraction within the microlens 18 is proportional to the reduction in the (final) density of the glass host material within the microlens 18, as compared to the density in the bulk of the substrate 16. By example, a 1% reduction in the final density of the material of the microlens 18 (after melting and re-solidification) results in an approximate 1% reduction in the index of refraction.

Threshold laser powers for microlens formation are on the order of hundreds of mW at room temperature, and decrease nearly linearly to tens of mW at temperatures near 300° C. This decrease in power requirements is due to an observed sharp rise in the SDG absorption with temperature. At or slightly above threshold intensities a microlens may take in excess of ten seconds to form, while at intensities significantly above threshold less than one second is required for microlens formation.

The diameter of the microlens 18 is a function of the size of the incident laser beam A, the wavelength of the beam, and the total exposure time to the beam. Lens diameters from approximately 8 μm to 170 μm have been demonstrated, with no observed impediment to increasing the diameter to greater than 170 μm (to, by example, at least 500 μm). The profile of the microlenses 18 fabricated in accordance with the method of this invention has been found to be generally well fitted by parabolic as well as spherical functions.

Figure 5:
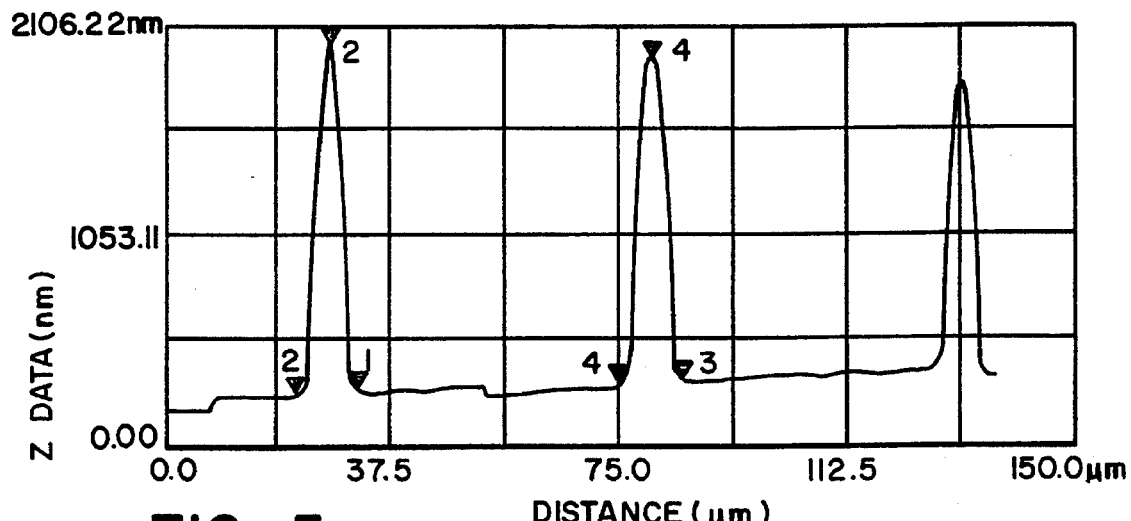
FIG. 5 is a graph, generated from data obtained with an atomic force microscope, showing the profiles of a plurality of the microlenses of FIG. 4.
Figure 6:
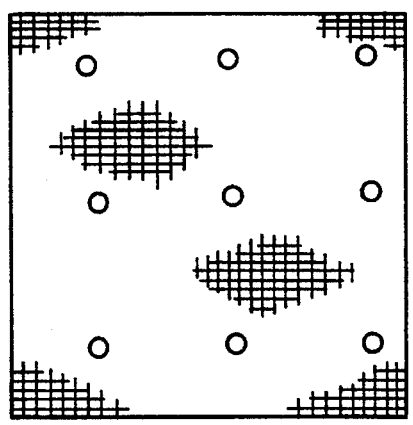
FIG. 6 is an enlarged planar view of the array of FIG. 4.
Figure 3:
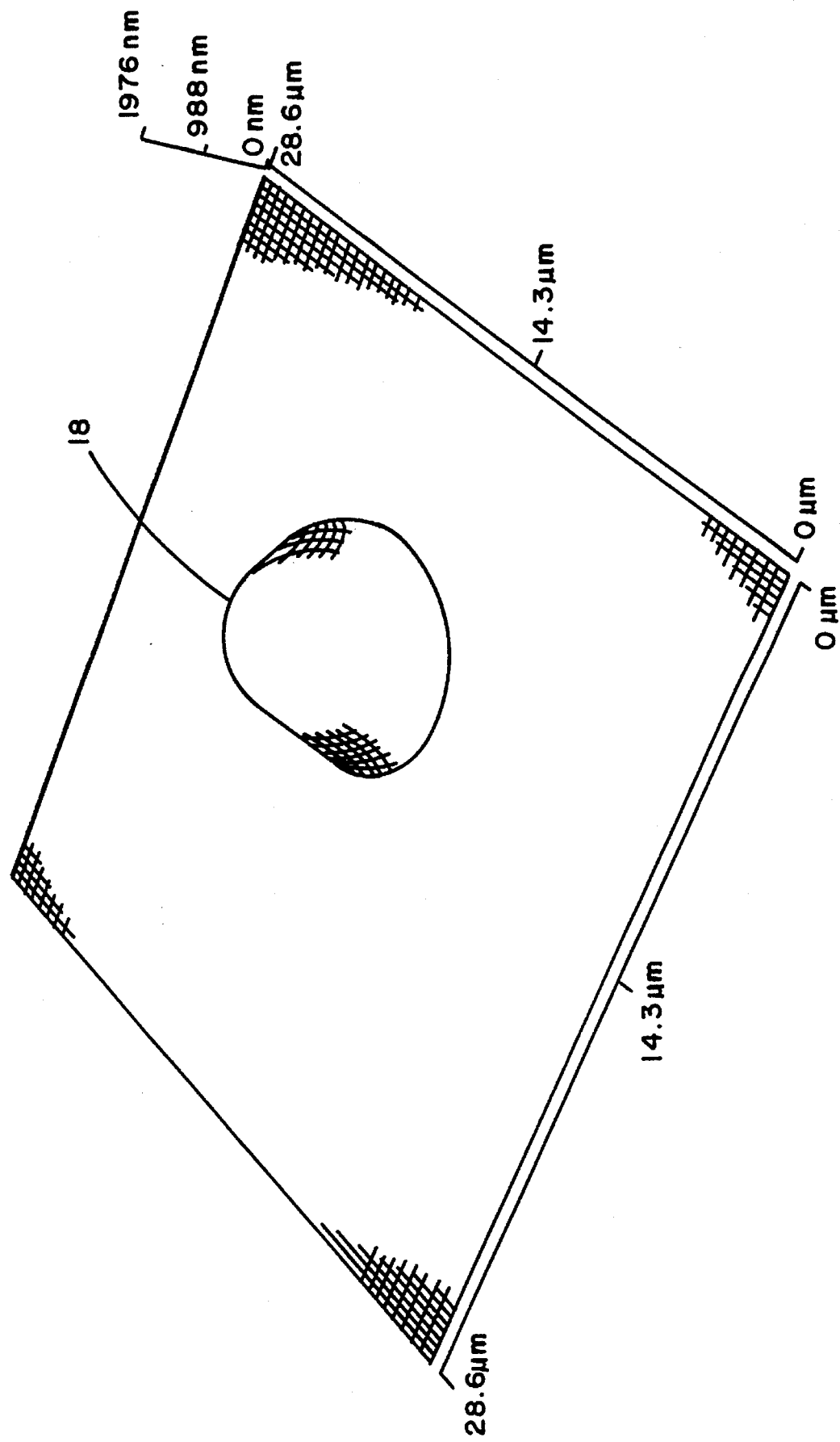
FIG. 3 is an enlarged elevational view of a single refractive microlens having a diameter of approximately 9 µm.
Figure 4:
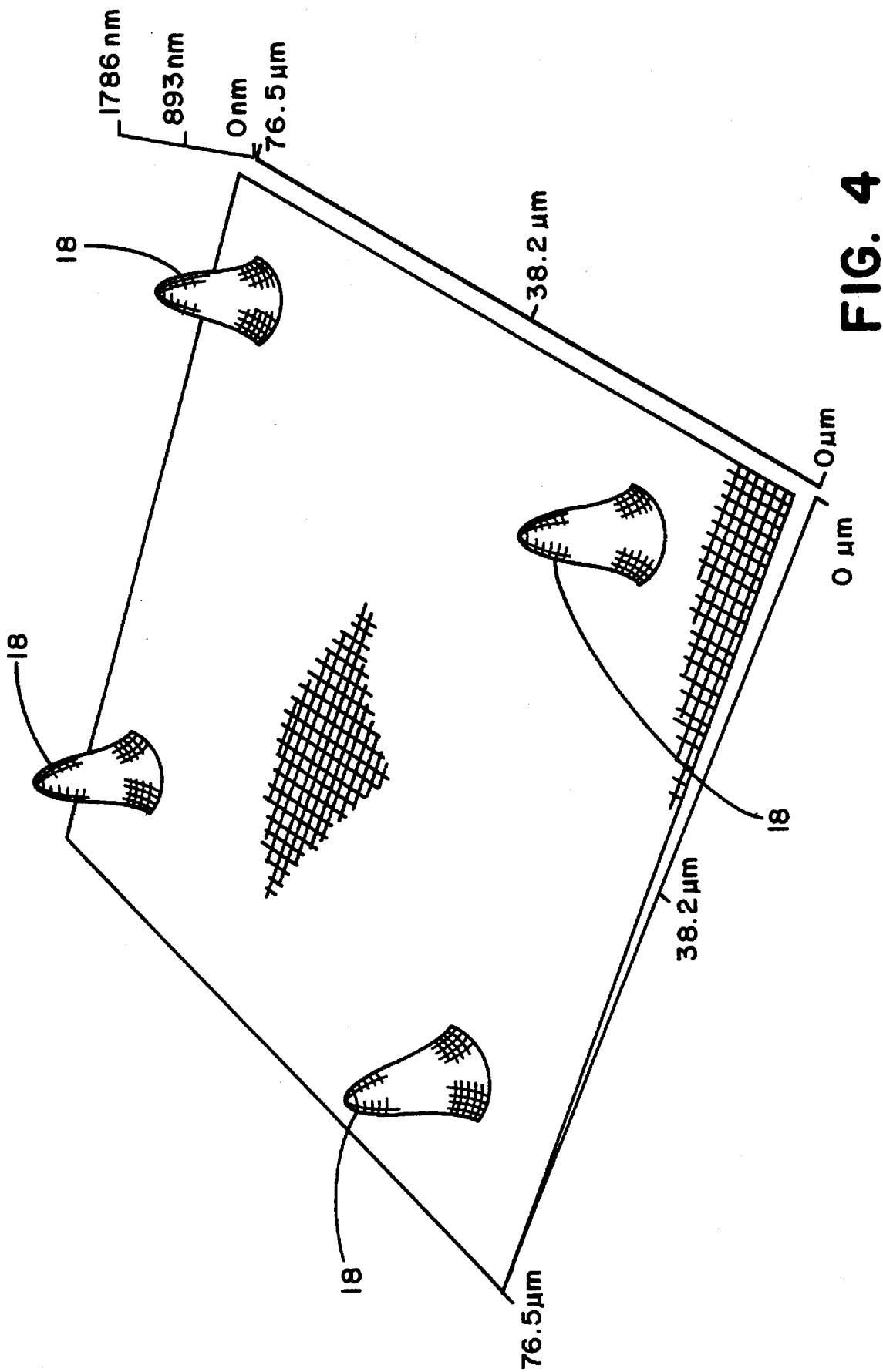
FIG. 4 is an enlarged elevational view of a plurality of microlenses that form a portion of a two-dimensional array of microlenses.

FIG. 3 is an enlarged elevational view of a single refractive microlens 18 having a diameter of approximately 9 μm. FIG. 4 is an enlarged elevational view of a plurality of microlenses 18 that form a portion of a two-dimensional array. FIG. 5 is a graph, generated from data obtained with an atomic force microscope, which shows the profiles of a plurality of the microlenses 18 of FIG. 4. FIG. 6 is an enlarged planar view of the array of FIG. 4. In FIG. 5 the points labeled 1–4 correspond to the dimensions shown in Table 1.

TABLE 1

|    | Distance | Height     |
|----|----------|------------|
| #1 | 9.44 μm  | 10.17 nm   |
| #2 | 4.72 μm  | 1758.18 nm |
| #3 | 9.10 μm  | 15.98 nm   |
| #4 | 5.06 μm  | 1634.56 nm |

FIGS. 7A and 7B illustrate a far field pattern of a single-mode fiber output taken through the SDG substrate 16 before the fabrication of the microlens 18 shown in FIG. 3. In contrast, FIGS. 8A and 8B illustrate a far field pattern of the single-mode fiber output taken through the SDG substrate 16 after propagation through the microlens 18 shown in FIG. 3. In particular, FIGS. 8A and 8B illustrate the focusing of the output of the single mode fiber at a distance of 16 mm, with the microlens 18 being located 430 μm from the tip of the fiber. This degree of focusing was produced with the microlens 18 of FIG. 3 which had a diameter of 130 μm and a height of 60 μm.

It can be appreciated that the selection of a suitable laser is a function of the bandgap wavelength of the selected SDG substrate 16, which in turn is a function of the desired band of wavelengths which are desired to be transmitted through the microlens 18. By example, focused cw laser light at 5145 Angstroms can be used with OG550 SDG to produce microlenses which can be used at all wavelengths longer than 5500 Angstroms.

Further by example, and if a broad range of visible light is desired to be transmitted through the microlens 18, then a SDG substrate containing CuCl nanocrystallites can be selected (CuCl has a bandgap wavelength in the ultra-violet (UV) range). An Argon-ion UV laser or a frequency tripled cw mode locked Nd:YAG laser having an output wavelength in the UV (above the bandgap wavelength of CuCl) can then be employed as the laser 12 in FIG. 1. Other suitable laser types (depending on the required wavelength) include, but are not limited to, frequency doubled Nd:YAG lasers, Argon lasers, and dye lasers.

Referring now to FIG. 9, it should also be realized that a relatively large diameter microlens 18a can be fabricated first, followed by one or more smaller diameter microlenses 18b that are formed on the larger microlens 18a. By example, the substrate 16 can be positioned along the z-axis so as to form a first focal spot size on the surface to fabricate the larger microlens 18a, after which the substrate 16 can be translated along the z-axis to reduce the diameter of the focal spot (and optionally also along the x and y axes) to fabricate the smaller microlens 18a. In this fashion a single microlens (or an array of microlenses) can be fabricated to have complex optical profiles and characteristics.

FIG. 9 also illustrates the depletion of the semiconductor nanocrystallites (indicated as 17) within the microlenses 18, 18a and 18b, as compared to the concentration within the glass host that does not experience the localized melting. FIG. 9 also illustrates the focussing to a focal point (FP) of below bandgap wavelength ($\lambda$) light by the microlens 18. Illumination of the substrate 16 can also be accomplished through the surface opposite the surface 16a upon which the microlens 18 is formed.

The thickness of the substrate 16 can be adjusted as desired either before or after microlens fabrication. In addition, a suitable anti-reflection coating can be applied to a radiation-receiving surface of the substrate 16.

After fabrication of the microlens 18 or an array of same the completed structure can be integrated as desired with other optical components, such as electromagnetic radiation emitters (e.g., an array of laser diodes) or electromagnetic radiation receivers (e.g., an array of photodetectors) so as to focus or collimate electromagnetic radiation having wavelengths longer than the bandgap wavelength of the semiconductor nanocrystallites that are embedded within the substrate 16. Free space optical interconnects can also be constructed using the microlenses of this invention.

While the invention has been particularly shown and described with respect to preferred embodiments thereof, it will be understood by those skilled in the art that changes in form and details may be made therein without departing from the scope and spirit of the invention. By example, other wavelength-selective materials (other than semiconductor microcrystallites) can be employed, such as glasses doped with ions such as Cerium, Neodymium and Europium. Other matrix materials (other than glass) can also be employed, such as polymers (e.g., PMMA). In this latter case the matrix material may be employed without a dopant, and a suitable laser, such as an IR $CO_2$ laser, is employed for forming the microlenses. Other types of optical devices can also be fabricated by the method of this invention, such as phase plates, phase masks, and anamorphic optics for diode laser collimation. It should further be realized that the microlens formation can occur in a vacuum or in an atmosphere selected for influencing the cooling rate and/or other parameters of the molten substrate material.

What is claimed is:

1. An optical device comprising a substrate having a surface, said substrate being comprised of a material that is substantially transparent at wavelengths of interest, said material having a first index of refraction at the wavelengths of interest, wherein a region of said surface extends away from said substrate for forming a refractive microlens, said microlens being comprised of a portion of said material that comprises said substrate, wherein said a portion of material that comprises said microlens has a second index of refraction that is less than said first index of refraction such that light having said wavelengths of interest experiences a phase change when passing through said microlens that differs from a phase change experienced when passing through said material that comprises said substrate.

2. An optical device comprising a substrate having a surface, said substrate being comprised of a material that is substantially transparent at wavelengths of interest, said material having a first index of refraction at the wavelengths of interest, wherein a region of said surface extends away from said substrate for forming a microlens, said microlens being comprised of a portion of said material, wherein said portion of material that comprises said microlens has a second index of refraction that is less than said first index of refraction such that light having said wavelengths of interest experiences a phase change when passing through said microlens that differs from a phase change experienced when passing through said material that comprises said substrate; wherein said material is comprised of a glass having semiconductor particles embedded within.

3. An optical device as set forth in claim 2 wherein said wavelengths of interest are longer than a bandgap wavelength of said semiconductor particles.

4. An optical device comprising a substrate having a surface, said substrate being comprised of a material that is substantially transparent at wavelengths of interest, said material having a first index of refraction at the wavelengths of interest, wherein a region of said surface extends away from said substrate for forming a microlens, said microlens being comprised of a portion of said material, wherein said portion of material that comprises said microlens has a second index of refraction that is less than said first index of refraction such that light having said wavelengths of interest experiences a phase change when passing through said microlens that differs from a phase change experienced when passing through said material that comprises said substrate; wherein said microlens has a substantially parabolic or spherical shape and a diameter in the range of about one micrometer to greater than 500 micrometers.

5. An optical device, comprising:
a substrate comprised of a material that is substantially transparent at wavelengths of interest, said material being comprised of a glass having semiconductor particles embedded within; and
a microlens extending from a surface of said substrate, said microlens having a substantially parabolic or spherical shape and also being comprised of said material, wherein said semiconductor particles have a first concentration within said material that comprises said substrate and
a second concentration within said material that comprises said microlens, and wherein said second concentration is less than said first concentration.

6. An optical device as set forth in claim 5 wherein said wavelengths of interest are longer than a bandgap wavelength of said semiconductor particles.

7. An optical device as set forth in claim 5 wherein said microlens has a diameter in the range of about one micrometer to greater than 500 micrometers.

8. An optical device, comprising:
a substrate comprised of a material that is substantially transparent at wavelengths of interest, said material being comprised of a glass having semiconductor particles embedded within; and
a microlens extending from a surface of said substrate, said microlens having a substantially parabolic or spherical shape and also being comprised of said material, wherein said material that comprises said substrate has a first density, wherein said material that comprises said microlens has a second density, and wherein said second density is less than said first density.

9. An optical device as set forth in claim 8 wherein said wavelengths of interest are longer than a bandgap wavelength of said semiconductor particles.

10. An optical device as set forth in claim 8 wherein said microlens has a diameter in the range of about one micrometer to greater than 500 micrometers.

11. A method for fabricating a microlens, comprising the steps of:
providing a substrate comprised of a glass having semiconductor particles embedded within, the glass being substantially transparent at wavelengths within a first range of wavelengths that are longer than a bandgap wavelength of the semiconductor particles; and
irradiating a portion of a surface of the substrate with laser light having a wavelength within a second range of wavelengths that is equal to or shorter than the bandgap wavelength of the semiconductor particles such that a portion of the laser light is absorbed for heating and melting the glass adjacent to the surface region, whereby the melted glass rises up above the surface to form, when re-solidified, a first microlens.

12. A method as set forth in claim 11 wherein the step of irradiating includes a step of focussing the laser light.

13. A method as set forth in claim 11 and further comprising the steps of:
translating the substrate; and
irradiating another portion of the surface to fabricate a second microlens.

14. A method as set forth in claim 11 wherein the portion of the surface has a diameter in the range of about one micrometer to greater than 500 micrometers.

15. A method as set forth in claim 11 wherein the microlens has a substantially parabolic or spherical shape.

16. A method as set forth in claim 11 and further comprising the steps of:
translating the substrate; and irradiating another portion of the surface to fabricate a second microlens upon the first microlens.

17. An optical device comprising a substrate having a surface, said substrate being comprised of a material that is substantially transparent at wavelengths of interest, said material having a first index of refraction at the wavelengths of interest, wherein a region of said surface extends away from said substrate and a portion of said material beneath said surface region forms an optical element having a surface topography that is a function of at least the surface tension and cooling rate of said the material when said material is in a localized molten state, wherein said material that comprises said optical element has a second index of refraction that is less than said first index of refraction such that light having said wavelengths of interest experiences a phase change when passing through said optical element that differs from a phase change experienced when passing through said material that comprises said substrate.

18. An optical device as set forth in claim 17 wherein said material is comprised of a glass having wavelength-selective absorbing particles embedded within.

19. An optical device as set forth in claim 18 wherein particles are comprised of at least one semiconductor material, and wherein said wavelengths of interest are longer than a bandgap wavelength of said semiconductor material.

* * * * *